US009801220B2

(12) United States Patent
Li et al.

(10) Patent No.: US 9,801,220 B2
(45) Date of Patent: Oct. 24, 2017

(54) METHOD, DEVICE AND SYSTEM FOR DEVICE TO DEVICE D2D DATA TRANSMISSION

(71) Applicant: Huawei Technologies Co., Ltd., Shenzhen (CN)

(72) Inventors: Yunbo Li, Shenzhen (CN); Yingpei Lin, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 118 days.

(21) Appl. No.: 14/966,974

(22) Filed: Dec. 11, 2015

(65) Prior Publication Data

US 2016/0100443 A1 Apr. 7, 2016

Related U.S. Application Data

(63) Continuation of application No. PCT/CN2014/072892, filed on Mar. 5, 2014.

(30) Foreign Application Priority Data

Jun. 14, 2013 (CN) .......................... 2013 1 0236153

(51) Int. Cl.
*H04W 76/02* (2009.01)
*H04W 8/00* (2009.01)

(52) U.S. Cl.
CPC ......... *H04W 76/023* (2013.01); *H04W 8/005* (2013.01); *H04W 76/021* (2013.01)

(58) Field of Classification Search
None
See application file for complete search history.

(56) References Cited

U.S. PATENT DOCUMENTS

2015/0071212 A1* 3/2015 Kim ................... H04W 72/042
370/329
2015/0163689 A1* 6/2015 Lee ....................... H04W 24/10
370/328

FOREIGN PATENT DOCUMENTS

CN 102946264 A 2/2013
CN 103024911 A 4/2013
(Continued)

OTHER PUBLICATIONS

"IEEE Standard for Information Technology—Telecommunications and information exchange between systems—Local and metropolitan area networks—Specific requirements; Part 11: Wireless LAN Medium Access Control (MAC) and Physical Layer (PHY) Specifications," IEEE Draft P802.11-REVmb/D12, pp. i-2782, Institute of Electrical and Electronics Engineers, New York, New York (Nov. 2011).

*Primary Examiner* — Kouroush Mohebbi
(74) *Attorney, Agent, or Firm* — Leydig, Voit & Mayer, Ltd.

(57) ABSTRACT

The present invention discloses a method, a device and a system for device to device D2D data transmission. The method includes: monitoring, by a first station in a sleep state, a beacon frame broadcast by an access point AP, setting up a direct link with a second station when it is determined that the beacon frame has a buffer information indication indicating that the second station needs to transmit data, and then receiving the data transmitted by the second station. The method and the device disclosed in the present invention aim to solve a problem of larger signaling overheads during setup of an existing D2D direct link.

14 Claims, 6 Drawing Sheets

(56) References Cited

FOREIGN PATENT DOCUMENTS

| CN | 103024914 A | 4/2013 |
|---|---|---|
| WO | WO 2011121374 A1 | 10/2011 |

\* cited by examiner

FIG. 7

METHOD, DEVICE AND SYSTEM FOR DEVICE TO DEVICE D2D DATA TRANSMISSION

CROSS-REFERENCE TO RELATED APPLICATIONS

This application is a continuation of International Patent Application No. PCT/CN2014/072892, filed on Mar. 5, 2014, which claims priority to Chinese Patent Application No. 201310236153.1, filed on Jun. 14, 2013, both of which are hereby incorporated by reference in their entireties.

TECHNICAL FIELD

The present invention relates to the field of wireless communication technologies and, in particular, to a method, a device and a system for device to device D2D data transmission.

BACKGROUND

A device to device (device to device, D2D) direct link eliminates a need for transmitting data via an access point, and avoids a delay caused by network congestions. For instance, in a wireless local area network (wireless local area network, WLAN), a station usually performs communications with other stations or networks via an access point. Even for stations within a same basic service set (basic service set, BSS), data communications therebetween also need to be forwarded via the access point, that is, a transmitting station transmits data to an access point first, and then the access point forwards the data to a receiving station. When the two stations are so close that data transmission/reception may be performed directly, the forwarding via the access point then will reduce system efficiency.

In order to solve this problem, a tunneled direct-link setup (tunneled direct-link setup, TDLS) mechanism is introduced. A main setup process of the TDLS is as follows.

When a station (an initiating station) sets up a TDLS link with another station (a responding station) in a same basic service set, the initiating station will first transmit a TDLS link setup request frame to the responding station via an access point. If the responding station agrees to set up the TDLS link, then it replies a TDLS link setup response frame to the initiating station via the access point, and indicates a successful setup in the response frame. After receiving the TDLS link setup response frame with a success indication, the initiating station will transmit an acknowledgment frame to the responding station via the access point so as to indicate acknowledgement of the TDLS link setup. After the TDLS link is set up, data transmission and reception may be performed between the initiating station and the responding station directly (that is, a D2D direct link is set up between the transmitting station and the responding station).

A power saving mechanism is supported in a current TDLS mode. In this mechanism, when a station in the TDLS has data to be transmitted to a receiving station, and the receiving station is in a sleep state, a transmitting station of the data will transmit an indication frame to an access point, and then the indication frame is forwarded by the access point to the receiving station. After receiving the indication frame, the receiving station transmits a response frame to the transmitting station, and then waits for the data transmitted by the transmitting station.

Figure 1:
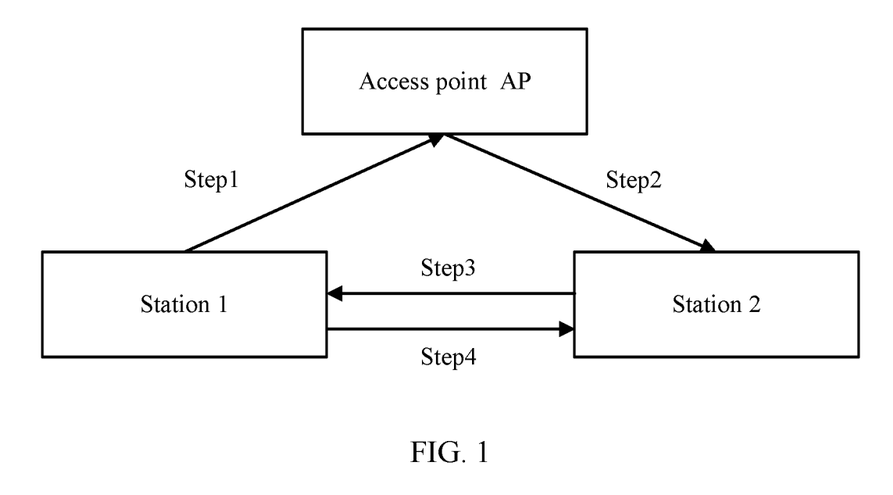
FIG. 1 is a schematic diagram of setup of a TDLS link according to TDLS Peer U-APSD in the prior art.

Reference may be made to FIG. 1 for a brief process for supporting the power saving mechanism, where a station 1 and a station 2 have set up a TDLS link successfully, and the station 2 is in a power saving state, whereas the station 1 has buffered data needing to be transmitted to the station 2. A transmitting process is as follows:

Step 1: a station 1 transmits a TDLS Peer Traffic Indication frame (reference may be made to Table 1 for a structure of the TDLS Peer Traffic Indication frame) to an access point;

TABLE 1

| Element sequence | Element name | Representation |
|---|---|---|
| 1 | Type | used to indicate that the type is TDLS |
| 2 | Action | used to indicate that the action is TDLS Peer Traffic Indication |
| 3 | Dialog Token | using an integer character to represent a dialog process of TDLS Peer Traffic Indication and TDLS Peer Traffic Response |
| 4 | Link identifier | used to indicate the TDLS link, including a BSSID, addresses of a TDLS initiating station and a TDLS responding station |
| 5 | PTI control | This item is optional, which is used to indicate a TID and a sequence number of a last MPDU transmitted to a target power saving station via the TDLS link |
| 6 | TPU buffer status | used to indicate an access type of buffered data |

Step 2: the access point forwards the TDLS Peer Traffic Indication frame to a station 2;

Step 3: after receiving the TDLS Peer Traffic Indication frame, the station 2 transmits a TDLS Peer Traffic Response frame (reference may be made to Table 2 for a structure of the TDLS Peer Traffic Response frame) to the station 1 via the TDLS link directly, and meanwhile maintains a waking state;

TABLE 2

| Element sequence | Element name | Representation |
|---|---|---|
| 1 | Type | used to indicate that the type is TDLS |
| 2 | Action | used to indicate that the action is TDLS Peer Traffic Response |
| 3 | Dialog Token | using an integer character to represent a dialog process of TDLS Peer Traffic Indication and TDLS Peer Traffic Response |
| 4 | Link identifier | used to indicate the TDLS link, including a BSSID, addresses of a TDLS initiating station and a TDLS responding station |

Step 4: the station 1 transmits data to the station 2;

It can be seen from setup of the TDLS that: during setup of a D2D direct link, if a receiving station is in a sleep state, then an access point needs to transmit an indication frame to the receiving station specially, and when a plurality of direct links need to perform data transmission, the access point needs to unicast an indication frame for each receiving station respectively, thereby resulting in larger signaling overheads during setup of data links.

SUMMARY

The present invention provides a method, a device and a system for device to device D2D data transmission, and the method and the device provided in the present invention aim to solve a problem of larger signaling overheads in the prior art caused by that an access point needs to transmit an indication frame to a receiving station specially.

In a first aspect, the present invention provides a method for device to device D2D data transmission, where the method includes:

monitoring, by a first station, a beacon frame broadcast by an access point AP, and detecting whether the beacon frame has a buffer information indication of a second station, where the first station is in a sleep state, and the buffer information indication is used to indicate that the second station has buffered data needing to be transmitted to the first station;

transmitting, by the first station, a response frame to the second station when it is determined that the beacon frame has the buffer information indication; and receiving, by the first station, the buffered data transmitted by the second station.

With reference to the first aspect, in a first possible implementation mode, when there are M first stations, the beacon frame has M element fields, buffer information indications carried in the M element fields are one-to-one corresponding to the M first stations, and M is an integer which is equal to or greater than 2.

With reference to the first aspect or the first possible implementation mode of the first aspect, in a second possible implementation mode, the buffer information indication includes an element ID, an element length and an element body, including:

the element ID is used to indicate that the beacon frame includes a buffer information indication field;

the element length is used to indicate a length of the buffer information indication field; and the element body includes identification information identifying the first station and the second station, where the identification information is used to set up a direct link between the first station and the second station.

With reference to the second possible implementation mode, in a third possible implementation mode, the identification information is a media access control MAC address of the first station and an MAC address of the second station.

With reference to the second possible implementation mode, in a fourth possible implementation mode, the identification information is a link identifier, the link identifier is a preset unique link identifier, and the preset unique link identifier is a unique D2D account in a basic service set assigned by the AP during setup of each D2D link, which is used to identify the D2D link that is set up.

With reference to the second possible implementation mode, in a fifth possible implementation mode, the identification information is a link identifier, the link identifier is specifically a D2D ID bitmap, and the D2D ID bitmap is a multi-bit sequence, where each bit in the multi-bit sequence indicates a D2D link.

With reference to the first aspect to the fifth possible implantation mode of the first aspect, in a sixth possible implementation, acquiring of the buffer information indication includes:

receiving, by the access point AP, a buffered data indication frame transmitted by the second station, where the indication frame is used to indicate that the second station has the buffered data needing to be transmitted to the first station; and extracting, by the AP, a buffer information indication in the buffered data indication frame.

With reference to the sixth possible implementation mode, in a seventh possible implementation mode, the buffered data indication frame includes a frame type, an Action, a dialog Token and a link identifier, where the frame type is used to indicate that a type of the data frame is the buffered data indication frame; the Action is used to indicate that an action corresponding to the data frame indicates that there is buffered data needing to be transmitted to a corresponding D2D sleeping station; the dialog Token identifies a dialog process of the data frame; and the link identifier is used to indicate a direct link set up between the first transmitting station and the second station.

In a second aspect, the present invention also provides another method for device to device D2D data transmission, and the method includes: transmitting, by a D2D transmitting station, a buffered data indication frame to an access point AP, where the indication frame is used to indicate that the D2D transmitting station has buffered data needing to be transmitted to a D2D sleeping station; extracting, by the AP, a buffer information indication in the buffered data indication frame, and carrying the buffer information indication in a beacon frame for broadcast transmission; monitoring, by the D2D sleeping station, the beacon frame, extracting the buffer information indication of the D2D transmitting station from the beacon frame, and transmitting a response frame to the D2D transmitting station; after receiving the response frame, transmitting, by the D2D transmitting station, the buffered data to the D2D sleeping station.

With reference to the second aspect, in a first possible implementation mode of the second aspect, the buffered data indication frame includes a frame type, an Action, a dialog Token and a link identifier, where the frame type is used to indicate that a type of the data frame is the buffered data indication frame; the Action is used to indicate that an action corresponding to the data frame indicates that there is buffered data needing to be transmitted to a corresponding D2D sleeping station; the dialog Token identifies a dialog process of the data frame; and the link identifier is used to indicate a direct link set up between the D2D transmitting station and the D2D sleeping station.

With reference to the first possible implementation mode of the second aspect, in a second possible implementation mode of the second aspect, an implementation mode of the link identifier includes:

the link identifier is a preset unique link identifier, and the preset unique link identifier is a unique D2D account in a basic service set assigned by the AP during setup of each D2D link, which is used to identify the D2D link that is set up;

the link identifier is specifically a D2D ID bitmap, and the D2D ID bitmap is a multi-bit sequence, where each bit in the multi-bit sequence indicates a D2D link.

In a third aspect, the present invention also provides a D2D terminal device with regard to the method provided in the first aspect, when the D2D terminal device serves as a first station to set up a direct link with a second station in a sleep state, the D2D terminal device includes:

a monitoring unit, configured to monitor a beacon frame broadcast by an access point AP, and detect whether the beacon frame has a buffer information indication of the second station, where the buffer information indication is used to indicate that the second station has buffered data needing to be transmitted to the first station;

a responding unit, configured to transmit a response frame to the second station when it is determined that the beacon frame has the buffer information indication; and a receiving unit, configured to receive the buffered data transmitted by the second station.

With reference to the third aspect, in a first possible implementation mode of the third aspect, when there are M first stations, the monitoring unit is further configured to monitor M element fields in the beacon frame, buffer information indications of D2D links carried in the M element fields are one-to-one corresponding to the M first stations, and M is an integer which is equal to or greater than 2.

With reference to the third aspect or the first possible implementation mode of the third aspect, in a second possible implementation mode of the third aspect, the monitoring unit is further configured to detect an element ID, an element length and an element body included in the buffer information indication to determine whether the beacon frame has a first buffer information indication of the second station, where the element ID is used to indicate that the beacon frame includes a buffer information indication field; the element length is used to indicate a length of the buffer information indication field; and the element body includes identification information identifying the first station and the second station, and the identification information is used to set up a direct link between the first station and the second station.

With reference to the second possible implementation mode of the third aspect, in a third possible implementation mode of the third aspect, the responding unit is further configured to determine a D2D direct link between the first station and the second station according to a media access control MAC address of the first station and an MAC address of the second station identified by the identification information.

With reference to the second possible implementation of the third aspect, in a fourth possible implementation mode of the third aspect, the identification information is a link identifier, and the responding unit is further configured to determine a D2D direct link between the first station and the second station according to the link identifier, where the link identifier is a preset unique link identifier, and the preset unique link identifier is a unique D2D account in a basic service set assigned by the AP during setup of each D2D link, which is used to identify the D2D link that is set up.

With reference to the second possible implementation mode of the third aspect, in a fifth possible implementation mode of the third aspect, the identification information is a link identifier, and the responding unit is further configured to determine a D2D direct link between the first station and the second station according to the link identifier, where the link identifier is specifically a D2D ID bitmap, and the D2D ID bitmap is a multi-bit sequence, where each bit in the multi-bit sequence indicates a D2D link.

In a fourth aspect, the present invention also provides a system for device to device D2D data transmission with regard to the method provided in the second aspect, the system includes:

a D2D transmitting station, configured to transmit a buffered data indication frame to an access point AP, where the indication frame is used to indicate that the D2D transmitting station has buffered data needing to be transmitted to a D2D sleeping station; and transmit the buffered data to the D2D sleeping station after receiving the response frame;

the access point, configured to extract a buffer information indication in the buffered data indication frame, and carry the buffer information indication in a beacon frame for broadcast transmission; and the D2D sleeping station, configured to monitor the beacon frame, extract the buffer information indication of the D2D transmitting station from the beacon frame, and transmit the response frame to the D2D transmitting station.

With reference to the fourth aspect, in a first possible implementation mode of the fourth aspect, the buffered data indication frame transmitted by the D2D transmitting station to the access point AP includes a frame type, an Action, a dialog Token and a link identifier, where the frame type is used to indicate that a type of the data frame is the buffered data indication frame; the Action is used to indicate that an action corresponding to the data frame indicates that there is buffered data needing to be transmitted to a corresponding D2D sleeping station; the dialog Token identifies a dialog process of the data frame; and the link identifier is used to indicate a direct link set up between the D2D transmitting station and the D2D sleeping station.

With reference to the first possible implementation mode of the fourth aspect, in a second possible implementation mode of the fourth aspect, the access point AP is further configured to, during setup of each D2D link, assign a preset first link identifier to a link that is set up, where the first link identifier uniquely identifies the link and where the first link identifier is a unique D2D account in a basic service set;

and is further configured to, during the setup of each D2D link, assign a multi-bit sequence to a link that is set up, where each bit in the multi-bit sequence indicates a D2D link.

The technical solutions provided in the present invention at least have the following technical effects:

A method and a device provided in embodiments of the present invention utilize a characteristic in the prior art where all D2D station need to monitor a beacon frame periodically, and carry buffered data information of a D2D link in the beacon frame for broadcasting. A receiving station may know whether a transmitting station has buffered data that needs to be transmitted to it by detecting a corresponding field in the beacon frame. Thus, a process where an access point unicasts an indication frame to a station supporting a D2D sleeping mechanism is avoided, signaling overheads are reduced, and meanwhile system efficiency is also improved.

DESCRIPTION OF EMBODIMENTS

Currently, during setup of a D2D direct link, when one station of two stations between which a direct link exists has data to be transmitted to a receiving station, and the receiving station is in a sleep state (this state is a power saving state), a transmitting station of the data will transmit a first indication frame to an access point, then the access point generates a specific indication frame to forward the first indication frame to the receiving station. After receiving the specific indication frame, the receiving station transmits a response frame to the transmitting station, and then waits for data transmitted by the transmitting station.

In the prior art, an access point needs to transmit a specific indication frame to a receiving station separately, signaling overheads are larger; in addition, if a plurality of D2D direct links in a power saving state need to perform data communications, the access point also needs to unicast a PTI frame for each data-to-be-received station separately, thereby resulting in larger signaling overheads. For a problem in the existed technical solution, the present invention provides a more efficient method for indicating data buffer information for a sleeping station in a D2D direct link, the method is specifically:

A method for device to device D2D data transmission, which specifically includes:

a first station monitors a beacon frame broadcast by an access point AP, and detects whether the beacon frame has a buffer information indication of a second station, where the first station is in a sleep state, and the buffer information indication is used to indicate that the second station has buffered data needing to be transmitted to the first station;

the first station transmits a response frame to the second station when the beacon frame has the buffer information indication; and the first station receives the buffered data transmitted by the second station.

According to the solution provided in embodiments of the present invention, a characteristic in the prior art is utilized where all stations need to monitor a beacon frame periodically, and buffered data information of a D2D direct link is carried in the beacon frame for broadcasting. A receiving station may know whether a transmitting station has buffered data that needs to be transmitted to it by detecting a corresponding field in the beacon frame. Thus, a process where an access point unicasts an indication frame to a station supporting a D2D sleeping mechanism is avoided, signaling overheads are reduced, and meanwhile system efficiency is also improved.

In order to better understand the above technical solution, the above technical solution will be described in detail hereunder with reference to accompanying drawings and specific implementations.

Embodiment 1

Figure 2:
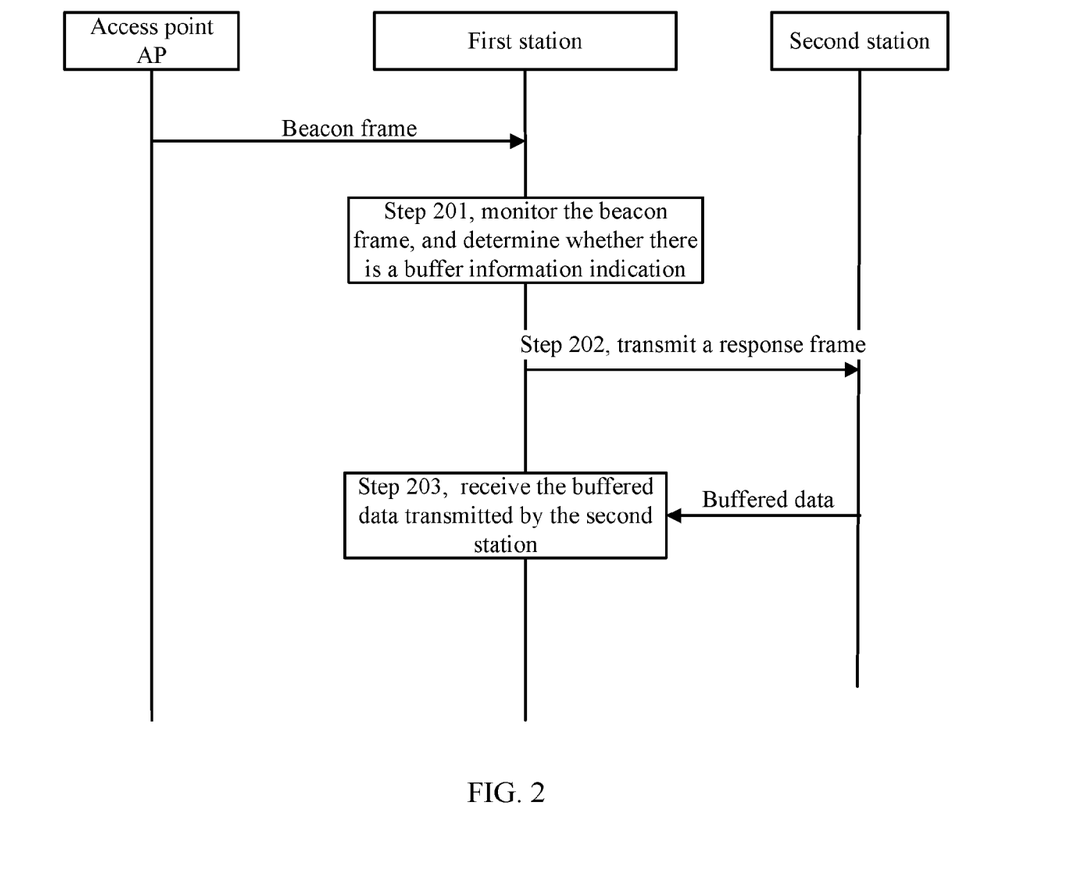
FIG. 2 is a schematic flow chart of a method for device to device D2D data transmission according to embodiment 1 of the present invention.

As shown in FIG. 2, an embodiment of the present invention provides a method for device to device D2D data transmission, specific implementation of the present invention will be described hereunder in detail with reference to accompanying drawings:

During introduction of the embodiment of the present invention, a station among D2D stations that has data needing to be transmitted is referred to as a D2D transmitting station (which is also referred to as a second station for a convenient description), if a D2D receiving station to which the D2D transmitting station transmits data is in a sleep mode, then the D2D receiving station is referred to as a D2D sleeping station (which is also referred to as a first station for a convenient description).

Step 201, a first station monitors a beacon frame broadcast by an access point AP, and detects whether the beacon frame has a buffer information indication of a second station, where the first station is in a sleep state, and the buffer information indication is used to indicate that the second station has buffered data needing to be transmitted to the first station.

Since all stations have a characteristic of periodically monitoring a beacon frame in the prior art, in the embodiment of the present invention, buffered data information (that is, the buffer information indication) of a D2D link is carried in the beacon frame for broadcasting.

Since different contents in the beacon frame are identified by different element fields, thus the carrying of the buffered data information in the beacon frame is to encapsulate the buffered data information into a field in compliance with a beacon frame format so as to carry it in the beacon frame. In the embodiment of the present invention, in order to acquire the buffered data information in the beacon frame, after monitoring the beacon frame transmitted by the AP, the first station (or referred to as a D2D sleeping station) also needs to detect a specific field of the beacon frame according to a preset rule, thereby determining whether the second station has buffered data needing to be transmitted to the first station.

In the embodiment of the present invention, before adding a corresponding buffer information indication to the beacon frame, the AP needs to determine through a certain manner which transmitting stations need to transmit data, thus a method for acquiring the buffer information indication in the embodiment of the present invention may be:

an access point AP receives a buffered data indication frame transmitted by a second station, where the indication frame is used to indicate that the second station has buffered data needing to be transmitted to a first station; and the AP extracts a buffer information indication in the buffered data indication frame.

The buffered data indication frame at least includes parameters such as a frame type, an Action, a dialog Token and a link identifier, specific functions of the parameters are:

the frame type is used to indicate that a type of the data frame is the buffered data indication frame;

the Action is used to indicate that an action corresponding to the data frame indicates that there is buffered data needing to be sent to a corresponding D2D sleeping station;

the dialog Token identifies a dialog process of the data frame; and the link identifier is used to indicate a direct link set up between the first transmitting station and the second station.

Step 202, when it is determined that the beacon frame has the buffer information indication, the first station transmits a response frame to the second station;

The step of "determining whether the beacon frame has the buffer information indication" means that the first station detects a buffer information indication in the beacon frame, and the buffer information indication is for itself. For instance, an identifier of the first station is a, then information identifying a is detected in the buffer information indication, and then it is determined that the beacon frame has the buffer information indication.

Step 203, the first station receives the buffered data transmitted by the second station.

In the embodiment of the present invention, in order to carry the buffer information indication in the beacon frame, the buffer information indication needs to be encapsulated into a field format specified by the beacon frame, thus, in the embodiment of the present invention, the buffer information indication field may include an element ID, an element length and an element body, where:

the element ID is used to indicate that the beacon frame has a buffer information indication field;

the element length is used to indicate a length of the buffer information indication field; and the element body includes identification information identifying the D2D transmitting station and the D2D sleeping station, where the identification information is used to set up a direct link between the first station and the second station.

In the embodiment of the present invention, a method for an AP to acquire whether a transmitting station has buffered data needing to be transmitted may be: receiving a buffered data indication frame transmitted by a D2D transmitting station, where the buffered data indication frame is used to indicate that the second station has the buffered data needing to be transmitted to the first station.

For the above method, then a specific implementation of detecting whether the beacon frame has the buffer information indication of the second station may be:

The first station detects a specific field of the beacon frame, that is, determine whether there is the element ID, if yes, then further detect whether a receiving end of the buffered data indicated in the element body is itself (indicating the receiving end as the first station), if yes, then it is determined that there is the buffer information indication transmitted by the second station to the first station.

In this embodiment, in order to enable the first station to determine that the data needing to be transmitted by the second station is transmitted to itself, the element body may include a media access control MAC address of the second station and an MAC address of the first station. Thus, the first station may set up a D2D link (or referred to as a direct link) with the second station via the MAC address, and perform data transmission and reception via the D2D link.

Since in the prior art, if a plurality of stations in a power saving state need to set up a D2D link, an access point also needs to unicast a specific indication frame for each data-to-be-received station separately, thereby resulting in a problem of larger signaling overheads. For the above problem, the embodiment of the present invention also provides a solution to notify sleeping stations of a plurality of D2D links simultaneously, a specific implementation may be:

When there are M first stations, the beacon frame has M element fields, buffer information indications carried in the M element fields are one-to-one corresponding to the M first stations, and M is an integer which is equal to or greater than 2.

In this embodiment, the first station (or referred to as a D2D sleeping station) is for each D2D link. Since a station A may set up D2D links with a plurality of other stations simultaneously, if the station A is corresponding to a plurality of links, when the station A enters into a sleep mode, then the station A needs to be treated as a plurality of D2D sleeping stations, that is, the plurality of D2D sleeping stations may be a same actual station.

Through monitoring a beacon frame and reading a buffer information indication field, each D2D sleeping station may know that a D2D transmitting station has buffer information needing to be transmitted to itself. The plurality of D2D sleeping stations request data from D2D transmitting stations via their respective D2D links after finding that there is buffered data for them.

Embodiment 2

Figure 3:
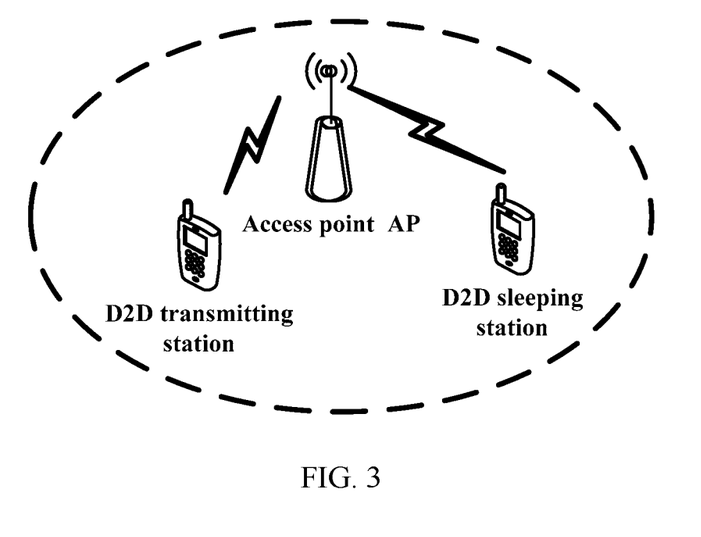
FIG. 3 is a schematic structural diagram of a network of a specific application of a method according to an embodiment of the present invention.
Figure 4:
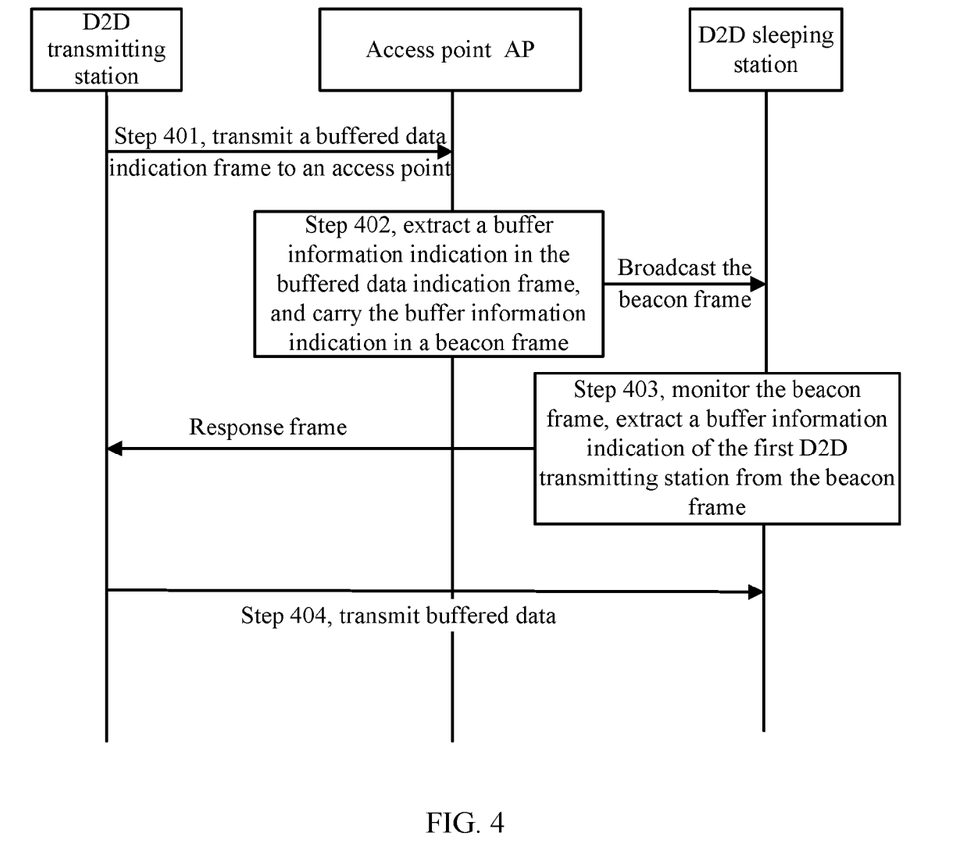
FIG. 4 is a schematic flow chart of a method for device to device D2D data transmission according to embodiment 2 of the present invention.

Reference may be made to FIG. 3 for a network structure, steps of a specific implementation of a method for device to device D2D data transmission provided in the present invention include (reference may be made to FIG. 4 for a method flowchart diagram):

Step 401, a D2D transmitting station transmits a buffered data indication frame to an access point AP, where the indication frame is used to indicate that the D2D transmitting station has buffered data to be transmitted to a D2D sleeping station;

The buffered data indication frame may completely reuse an existing TDLS Peer Traffic Indication frame, or a new frame format may be designed. However, whether the existing TDLS Peer Traffic Indication frame is reused or a new frame is used, a format of the buffered data indication frame at least includes four parts: frame type, Action, dialog Token and link identifier, where the frame type is used to indicate that a type of the data frame is the buffered data indication frame; the Action is used to indicate that an action corresponding to the data frame indicates that there is buffered data needing to be transmitted to a corresponding D2D sleeping station; the dialog Token identifies a dialog process of the data frame; and the link identifier is used to indicate a direct link set up between the D2D transmitting station and the D2D sleeping station.

In the embodiment of the present invention, the type, the Action and the dialog Token may have same definitions as those of the existing TDLS Peer Traffic Indication frame.

The link identifier newly added in the embodiment of the present invention may be implemented by various manners, and two optimal methods are provided as below:

Manner 1, identifying the D2D link via a unique D2D account; a specific implementation may be:

A, the link identifier is a preset unique link identifier, and the unique link identifier is a unique D2D account in a basic service set assigned by the AP during setup of each D2D link, which is used to identify the D2D link; if the D2D link has communications in two different directions, then the corresponding D2D accounts are different;

B, the link identifier is a sequence number assigned by the AP, where the sequence number also identifies the communications in two different directions of the D2D link.

Since the communications of the D2D link is bidirectional, two different sequence numbers may be assigned by the AP, respectively representing the communications of two different directions. A bit of the sequence numbers may also be specified to indicate the direction of the communications.

Step 402, the AP extracts a buffer information indication in the buffered data indication frame, and carries the buffer information indication in a beacon frame for broadcast transmission;

When the buffered data indication frame is carried in the beacon frame, the buffer information indication includes three parts: an element ID, an element length and an element body. The element ID uses an element sequence number to indicate the buffered data indication frame, and a function thereof is equivalent to a function of type+Action in a current TDLS Peer Traffic Indication frame. The length is used to indicate the number of bytes of the element body. The element body includes other parts of the buffered data indication frame except the type and the Action.

The element ID is used to indicate that the beacon frame includes a buffer information indication field; the element length is used to indicate a length of the buffer information indication field; and the element body includes identification information identifying the D2D transmitting station and the D2D sleeping station.

Step 403, the D2D sleeping station monitors the beacon frame, extracts a buffer information indication of the D2D transmitting station from the beacon frame, and transmits a response frame to the D2D transmitting station;

During the extraction of the buffer information indication, the sleeping station first detects the element ID, and if the element ID indicates that the field is a D2D buffered data indication frame, then further detects a part corresponding to a link identifier in the element body, and if it (the D2D sleeping station) belongs to a receiving station of a link represented by the link identifier, it means that there is a D2D transmitting station which has buffered data for it (the D2D sleeping station) to receive.

Step 404, after receiving the response frame, the D2D transmitting station transmits the buffered data to the D2D sleeping station.

According to the solution provided in the embodiment of the present invention, a characteristic in the prior art is utilized where all stations need to monitor a beacon frame periodically, and buffered data information of a D2D link is carried in the beacon frame for broadcasting. A receiving station may know whether a transmitting station has buffered data that needs to be transmitted to it by detecting a corresponding field in the beacon frame. Thus, a process where an access point unicasts an indication frame to a station supporting a D2D sleeping mechanism is avoided, signaling overheads are reduced, and meanwhile system efficiency is also improved.

In addition, in the embodiment of the present invention, the buffered data indication is carried in the beacon frame for transmission, which may reduce signaling overheads, but when the beacon frame carries buffer indication information, the information identifying each D2D link carried in the element body at least needs to indicate two stations which are a transmitting end and a receiving end. If an MAC address is used, 12 Bytes will be occupied, and even though an AID is used, 4 Bytes will also be occupied. When multiple links are indicated simultaneously, indication overheads will also be relatively large. Thus, with regard to the above problem, the embodiment of the present invention also provides two methods for generating a link identifier in order to reduce the indication overheads, which are specifically:

Method 1, in this embodiment, in order to further reduce indication overheads in the beacon frame, when identification information identifying a first station and a second station is included in a generated element body, a D2D ID concept is introduced.

The identification information is a link identifier, the link identifier is specifically a preset unique link identifier, and the preset unique link identifier is a unique D2D account in a basic service set assigned by the AP during setup of each D2D link, which is used to identify the D2D link that is set up.

A, the link identifier is a preset unique link identifier, and the unique link identifier is a unique D2D account in a basic service set assigned by the AP during setup of each D2D link, which is used to identify the D2D link; if the D2D link has communications in two different directions, then the corresponding D2D accounts are different;

B, the link identifier is a sequence number assigned by the AP, where the sequence number also identifies the communications in two different directions of the D2D link.

Since the communications of the D2D link is bidirectional, two different sequence numbers may be assigned by the AP, respectively representing the communications of two different directions. A bit of the sequence numbers may also be specified to indicate the direction of the communications.

For instance, a Byte is used to indicate a D2D ID, and 256 D2D links may be supported simultaneously. An MAC address or an AID is replaced by using the D2D ID, which may effectively reduce the indication overheads.

Method 2, when a great number of D2D links need to be indicated, a form of D2D ID bitmap (bitmap) is used, which may further reduce the indication overheads.

The link identifier is specifically a D2D ID bitmap, and the D2D ID bitmap is a multi-bit sequence, where each bit in the multi-bit sequence indicates a D2D link.

The so-called D2D ID bitmap means that each bit in a bit sequence is used to indicate a D2D link.

For instance, the first bit is used to indicate a link of which the D2D ID is equal to 0, the second bit is used to indicate a link of which the D2D ID is equal to 1, and so on. A specific format thereof is similar to the buffered data indication element of a single D2D link, including three parts: an element ID, a length and an element body. The element body includes a bitmap of D2D links and, alternatively, also includes fields such as dialog Token, PTI control and TPU buffer status of each D2D link that has buffered data. It should be noted that the method of representation via bitmap needs to use an element sequence different from the buffer information indication element of the single D2D link for representation. When a bit corresponding to a certain D2D ID is indicated as 0, it represents that the D2D link does not have buffered data to be transmitted; when a bit corresponding to a certain D2D ID is indicated as 1, it represents that the D2D link has buffered data to be transmitted.

For instance, when the AP assigns totally 16 D2D IDs from 0-15, and three D2D links of which D2D IDs in a beacon frame are equal to 3, 7, 12 have buffered data within a certain beacon period, then 0001000100001000 may be used for representation.

When a certain D2D sleeping station finds that its D2D ID or a corresponding bit in a D2D ID bitmap indicates that there is buffered data, the sleeping station may then transmit a response frame or a data request frame to its D2D transmitting station so as to get data.

According to a solution provided in the embodiment of the present invention, a characteristic in the prior art is utilized where all stations need to monitor a beacon frame periodically, and buffered data information of a D2D link is carried in the beacon frame for broadcasting. A receiving station may know whether a transmitting station has buffered data that needs to be transmitted to it by detecting a corresponding field in the beacon frame. Thus, a process where an access point unicasts an indication frame to a station supporting a D2D sleeping mechanism is avoided, signaling overheads are reduced, and meanwhile system efficiency is also improved.

Moreover, in a beacon frame, a plurality of field elements may be used to indicate data transmission of a plurality of D2D transmitting stations and D2D receiving stations respectively, thereby solving a problem of larger signaling overheads caused in the prior art where an access point needs to unicast a PTI frame for each data-to-be-received station separately if a plurality of TDLS links in a power saving state need to perform data communications.

Furthermore, whether there is one transmitting station or a plurality of transmitting stations, additional information contents need to be added to the beacon frame, In order to achieve a purpose of minimum indication overheads, the link identifier added into the beacon frame according to the embodiment of the present invention is indicated through a D2D ID or a D2D ID bitmap.

Embodiment 3

Figure 5:
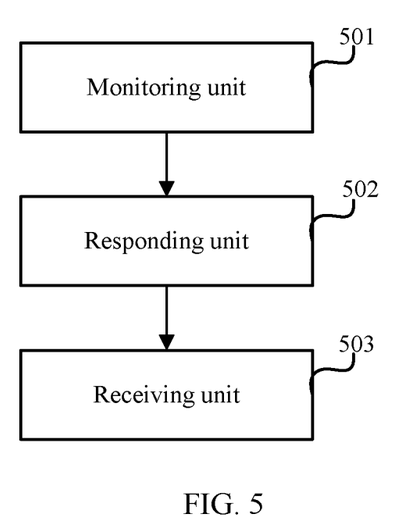
FIG. 5 is a schematic structural diagram of a D2D terminal device according to an embodiment of the present invention.

With regard to the method provided in Embodiment 1, an embodiment of the present invention also provides a D2D terminal device, when the D2D terminal device serves as a first station to set up a direct link with a second station in a sleep state, the D2D terminal device includes (reference may be made to FIG. 5 for a specific structure):

a monitoring unit 501, configured to monitor a beacon frame broadcast by an access point AP, and detect whether the beacon frame has a buffer information indication of the second station, where the buffer information indication is used to indicate that the second station has buffered data needing to be transmitted to the first station;

a responding unit 502, configured to transmit a response frame from the first state to the second station when it is determined that the beacon frame has the buffer information indication; and a receiving unit 503, configured to receive the buffered data transmitted by the second station.

Since in the prior art, if a plurality of D2D direct links in a power saving state need to perform data communications, an access point also needs to unicast a PTI frame for each data-to-be-received station separately, thereby resulting in a problem of larger signaling overheads. The embodiment of the present invention also provides a solution to notify sleeping stations of a plurality of D2D links simultaneously, which is specifically:

When there are M first stations, the monitoring unit 501 is further configured to monitor M element fields in the beacon frame, buffer information indications of D2D links carried in the M element fields are one-to-one corresponding to the M first stations, and M is an integer which is equal to or greater than 2.

When the monitoring unit 501 detects whether the beacon frame has a first buffer information indication of the second station, the monitoring unit 501 detects an element ID, an element length and an element body included in the buffer information indication to determine whether the beacon frame has the first buffer information indication of the second station, where the element ID is used to indicate that the beacon frame includes a buffer information indication field; the element length is used to indicate a length of the buffer information indication field; and the element body includes identification information identifying the first station and the second station, where the identification information is used to set up a direct link between the first station and the second station.

In this embodiment, in order to enable a D2D direct link relation to be determined between the first station and the second station and realize setup of the D2D direct link, the responding unit 502 is further configured to setup a direct link between the first station and the second station according to a media access control MAC address of the first station and an MAC address of the second station identified by the identification information.

In addition, in the embodiment of the present invention, the buffered data indication is carried in the beacon frame for transmission, which may reduce signaling overheads, but when the beacon frame carries buffer indication information, the information identifying each D2D link carried in the element body at least needs to indicate two stations which are a transmitting end and a receiving end. If an MAC address is used, 12 Bytes will be occupied, and even though an AID is used, 4 Bytes will also be occupied. When a plurality of links are indicated simultaneously, indication overheads will also be relatively large. Thus, with regard to the above problem, according to the embodiment of the present invention, in order to further reduce the indication overheads, the responding unit 502 is further configured to:

A, the identification information is a link identifier, and the responding unit 502 is further configured to determine a D2D direct link between the first station and the second station according to the link identifier, where the link identifier is a preset unique link identifier, and the preset unique link identifier is a unique D2D account in a basic service set assigned by the AP during setup of each D2D link, which is used to identify the D2D link that is set up.

B, the indication information is a link identifier, and the responding unit 502 is further configured to determine a D2D direct link between the first station and the second station according to the link identifier, where the link identifier is specifically a D2D ID bitmap, and the D2D ID bitmap is a multi-bit sequence, where each bit in the multi-bit sequence indicates a D2D link.

Embodiment 4

Figure 6:
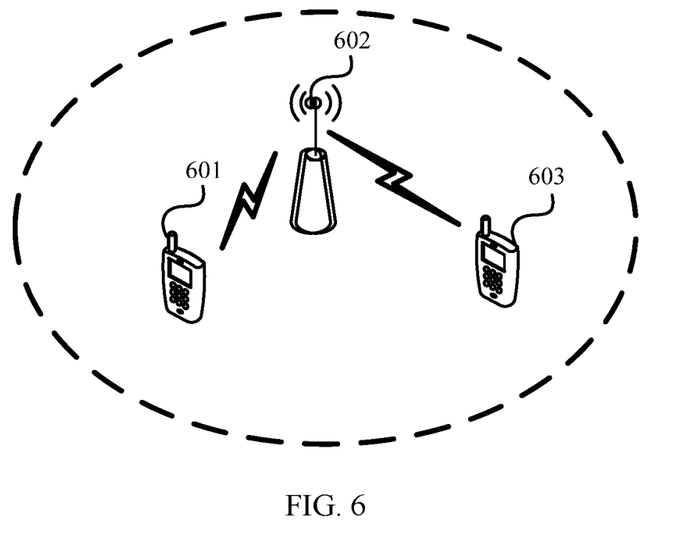
FIG. 6 is a schematic structural diagram of a system for D2D device to device D2D data transmission according to an embodiment of the present invention.

With regard to the method provided in Embodiment 2, the embodiment of the present invention also provides a system for D2D device to device D2D data transmission, the system includes (reference may be made to FIG. 6 for a specific structure):

a D2D transmitting station 601, configured to transmit a buffered data indication frame to an access point AP, where the indication frame is used to indicate that the D2D transmitting station has buffered data needing to be transmitted to a D2D sleeping station; and transmitting the buffered data to the D2D sleeping station after receiving the response frame.

the access point AP 602, configured to extract a buffer information indication in the buffered data indication frame, and carry the buffer information indication in a beacon frame for broadcast transmission;

the D2D sleeping station 603, configured to monitor the beacon frame, extract the buffer information indication of the D2D transmitting station from the beacon frame, and transmit the response frame to the D2D transmitting station.

The buffered data indication frame may reuse an existing TDLS Peer Traffic Indication frame, or a new frame format may be designed. However, whether the existing TDLS Peer Traffic Indication frame is reused or a new frame is used, a format of the buffered data indication frame should at least include four parts: frame type, Action, dialog Token and link identifier, where the frame type is used to indicate that a type of the data frame is the buffered data indication frame;

Thus, the buffered data indication frame transmitted by the D2D transmitting station 601 to the access point AP 602 includes a frame type, an Action, a dialog Token and a link identifier, where the frame type is used to indicate that a type of the data frame is the buffered data indication frame; the Action is used to indicate that an action corresponding to the data frame indicates that there is buffered data needing to be transmitted to a corresponding D2D sleeping station; the dialog Token defines a dialog process of the data frame; and the link identifier is used to indicate a direct link set up between the D2D transmitting station and the D2D sleeping station.

When the beacon frame carries buffer indication information, identification information of two stations which are a transmitting end and a receiving end at least needs to be indicated for each D2D link. If an MAC address is used, 12 Bytes will be occupied, and even though an AID is used, 4 Bytes will also be occupied. When multiple links are indicated simultaneously, indication overheads will also be relatively large. According to an embodiment of the present invention, in order to further reduce the indication overheads, the link identifier which is newly added in the embodiment of the present invention may be implemented via various manners, and two optimal manners are provided as follows:

The access point AP 602 is further configured to, during setup of each D2D link, assign a preset first link identifier to a link that is set up, where the first link identifier uniquely identifies the link and where the first link identifier is a unique D2D account in a basic service set; during setup of each D2D link, assign a multi-bit sequence to a link that is set up, where each bit in the multi-bit sequence indicates a D2D link.

Embodiment 5

Figure 7:
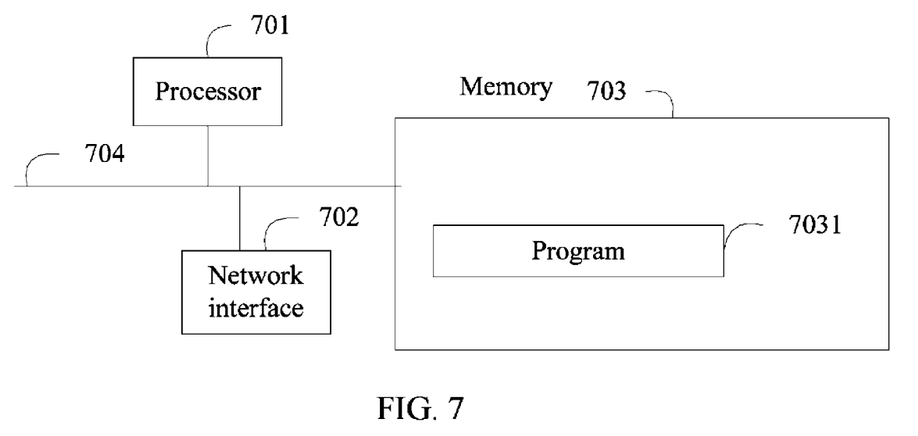
FIG. 7 is a schematic structural diagram of a terminal according to an embodiment of the present invention.

As shown in FIG. 7, the present invention also provides another terminal, which is configured to perform a data transmission method in the foregoing embodiments, including at least one processor 701 (such as a CPU), at least one network interface 702 or other communication interfaces, a memory 703, and at least one communication bus 704 which is configured to realize connection communications among these apparatus. The processor 701 is configured to execute an executable module stored in the memory 703, such as a computer program. The memory 703 may include a high-speed random access memory (RAM: Random Access Memory), and may also include a non-volatile memory (non-volatile memory), such as at least one disk memory. Communication connections between the system gateway and at least one further network element are implemented via at least one network interface 702 (may be wired or wireless), and an internet, a wide area network, a local network, a metropolitan area network or the like may be used.

In some implementations, the memory stores a program 7031, the program may be executed by the processor, and this program includes: monitoring a beacon frame broadcast by an access point AP, and detecting whether the beacon frame has a buffer information indication of a second station, where the first station is in a sleep state, and the buffer information indication is used to indicate that the second station has buffered data needing to be transmitted to the first station (the terminal); the first station transmitting a response frame to the second station when it is determined that the beacon frame has the buffer information indication; and the first station receiving the buffered data transmitted by the second station.

One or more technical solutions provided in embodiments of the present application above at least have the following technical effects:

According to a solution provided in an embodiment of the present invention, a characteristic in the prior art is utilized where all stations need to monitor a beacon frame periodically and buffered data information of a D2D link is carried in the beacon frame for broadcasting. A receiving station may know whether a transmitting station has buffered data that needs to be transmitted to it by detecting a corresponding field in the beacon frame. Thus, a process where an access point unicasts an indication frame to a station supporting a D2D sleeping mechanism is avoided, signaling overheads are reduced, and meanwhile system efficiency is also improved.

Moreover, in a beacon frame, a plurality of field elements may be used to indicate data transmission of a plurality of D2D transmitting stations and D2D receiving stations respectively, thereby solving a problem of larger signaling overheads caused in the prior art where an access point needs to unicast a PTI frame for each data-to-be-received station separately if a plurality of TDLS links in a power saving state need to perform data communications.

Furthermore, whether there is one transmitting station or a plurality of transmitting stations, additional information contents need to be added to the beacon frame. In the present invention, in order to achieve a purpose of minimum indication overheads, the link identifier added into the beacon frame according to the embodiment of the present invention is indicated through a D2D ID or a D2D ID bitmap. Thus, the indication overheads are effectively reduced.

The present patent scheme has no strong correlation to setup of a direct link between stations, which may be applicable to a mechanism of setup of a direct link between a station and a further station apart from the TDLS.

The method according to the present invention is not limited to the embodiments in the specific implementations, and other implementations obtained by persons skilled in the art according to the technical solutions of the present invention also belong to the scope of technical innovations of the present invention.

Obviously, persons skilled in the art may make modifications and variations to the present invention without departing from the spirit and the scope of the present invention. Thus, if these modifications and variations of the present invention belong to the scope of the claims of the present invention and equivalent technologies thereof, then the present invention is also intended to include these modifications and variations.

What is claimed is:

1. A method for device to device (D2D) data transmission, wherein the method comprises:
    monitoring, by a first station, a beacon frame broadcast by an access point (AP), and detecting whether the beacon frame has a buffer information indication of a second station, wherein the first station is in a sleep state, and the buffer information indication is used to indicate that the second station has buffered data to be transmitted to the first station;
    transmitting, by the first station, a response frame to the second station when it is determined that the beacon frame has the buffer information indication; and
    receiving, by the first station, the buffered data transmitted by the second station.

2. The method according to claim 1, wherein, when there are M first stations, the beacon frame has M element fields, wherein buffer information indications carried in the M element fields are one-to-one corresponding to the M first stations, and M is an integer which is equal to or greater than 2.

3. The method according to claim 1, wherein the buffer information indication comprises an element ID, an element length and an element body, wherein:
    the element ID is used to indicate that the beacon frame comprises a buffer information indication field;
    the element length is used to indicate a length of the buffer information indication field; and
    the element body comprises identification information identifying the first station and the second station, wherein the identification information is used to set up a direct link between the first station and the second station.

4. The method according to claim 3, wherein the identification information is a media access control (MAC) address of the first station and a MAC address of the second station.

5. The method according to claim 3, wherein the indication information is a link identifier, the link identifier is a preset unique link identifier, and the preset unique link identifier is a unique D2D account in a basic service set assigned by the AP during setup of each D2D link, which is used to identify the D2D link that is set up.

6. The method according to claim 3, wherein the identification information is a link identifier, the link identifier is a D2D ID bitmap, and the D2D ID bitmap is a multi-bit sequence, wherein each bit in the multi-bit sequence indicates a D2D link.

7. The method according to claim 1, further comprising:
receiving, by the AP, a buffered data indication frame transmitted by the second station, wherein the indication frame is used to indicate that the second station has the buffered data to be transmitted to the first station; and
extracting, by the AP, a buffer information indication in the buffered data indication frame.

8. The method according to claim 7, wherein the buffered data indication frame comprises a frame type, an Action, a dialog Token and a link identifier, wherein the frame type is used to indicate that a type of the data frame is the buffered data indication frame; the Action is used to indicate that an action corresponding to the data frame indicates that there is buffered data to be transmitted to a corresponding D2D sleeping station; the dialog Token identifies a dialog process of the data frame; and the link identifier is used to indicate a direct link set up between the first station and the second station.

9. A device to device (D2D) terminal device that serves as a first station to set up a direct link with a second station in a sleep state, the D2D terminal device comprising:
a monitoring unit, configured to monitor a beacon frame broadcast by an access point (AP), and to detect whether the beacon frame has a buffer information indication of the second station, wherein the buffer information indication is used to indicate that the second station has buffered data needing to be transmitted to the first station;
a responding unit, configured to transmit a response frame from the first station to the second station when it is determined that the beacon frame has the buffer information indication; and
a receiving unit, configured to receive the buffered data transmitted by the second station.

10. The D2D terminal device according to claim 9, wherein, when there are M first stations, the monitoring unit is further configured to monitor M element fields in the beacon frame, wherein buffer information indications of D2D links carried in the M element fields are one-to-one corresponding to the M first stations, and M is an integer which is equal to or greater than 2.

11. The D2D terminal device according to claim 9, wherein the monitoring unit is further configured to detect an element ID, an element length and an element body comprised in the buffer information indication to determine whether the beacon frame has a first buffer information indication of the second station, wherein the element ID is used to indicate that the beacon frame comprises a buffer information indication field; the element length is used to indicate a length of the buffer information indication field; and the element body comprises identification information identifying the first station and the second station, and the identification information is used to set up a direct link between the first station and the second station.

12. The D2D terminal device according to claim 11, wherein the responding unit is further configured to determine a D2D direct link between the first station and the second station according to a media access control (MAC) address of the first station and a MAC address of the second station identified by the identification information.

13. The D2D terminal device according to claim 11, wherein the indication information is a link identifier, and the responding unit is further configured to determine a D2D direct link between the first station and the second station according to the link identifier, wherein the link identifier is a preset unique link identifier, and the preset unique link identifier is a unique D2D account in a basic service set assigned by the AP during setup of each D2D link, which is used to identify the D2D link that is set up.

14. The D2D terminal device according to claim 11, wherein the indication information is a link identifier, and the responding unit is further configured to determine a D2D direct link between the first station and the second station according to the link identifier, wherein the link identifier is a D2D ID bitmap, and the D2D ID bitmap is a multi-bit sequence, wherein each bit in the multi-bit sequence indicates a D2D link.

* * * * *